United States Patent
Ahn et al.

(10) Patent No.: US 11,689,376 B2
(45) Date of Patent: Jun. 27, 2023

(54) SECURITY DEVICE FOR GENERATING MASKING DATA BASED ON PHYSICALLY UNCLONABLE FUNCTION AND OPERATING METHOD THEREOF

(71) Applicant: Samsung Electronics Co., Ltd., Suwon-si (KR)

(72) Inventors: Kyoungmoon Ahn, Seoul (KR); Yongki Lee, Suwon-si (KR); Yongsoo Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 276 days.

(21) Appl. No.: 17/020,287

(22) Filed: Sep. 14, 2020

(65) Prior Publication Data

US 2021/0243042 A1 Aug. 5, 2021

(30) Foreign Application Priority Data

Jan. 30, 2020 (KR) .................. 10-2020-0011354

(51) Int. Cl.
*H04L 9/32* (2006.01)
*H04L 9/08* (2006.01)

(52) U.S. Cl.
CPC .......... *H04L 9/3278* (2013.01); *H04L 9/0866* (2013.01); *H04L 2209/04* (2013.01); *H04L 2209/12* (2013.01)

(58) Field of Classification Search
CPC . H04L 9/3278; H04L 9/0866; H04L 2209/04; H04L 2209/12
See application file for complete search history.

(56) References Cited

U.S. PATENT DOCUMENTS

| | | | |
|---|---|---|---|
| 8,510,608 B2 | 8/2013 | Futa et al. | |
| 9,985,791 B2 | 5/2018 | Cambou | |
| 10,142,102 B2 | 11/2018 | Pedersen | |
| 2015/0188717 A1 | 7/2015 | Wu et al. | |
| 2016/0156476 A1* | 6/2016 | Lee | H04L 9/088 380/44 |
| 2017/0295015 A1* | 10/2017 | Pedersen | H04L 9/0894 |
| 2018/0145838 A1 | 5/2018 | Wang et al. | |
| 2018/0262331 A1* | 9/2018 | Noguchi | H04L 9/0866 |
| 2018/0278418 A1 | 9/2018 | Chang et al. | |
| 2019/0305973 A1 | 10/2019 | Dewan | |
| 2020/0104101 A1* | 4/2020 | Satpathy | G06F 21/755 |

FOREIGN PATENT DOCUMENTS

KR 101974465 B1 8/2019

* cited by examiner

*Primary Examiner* — Ellen Tran
(74) *Attorney, Agent, or Firm* — Muir Patent Law, PLLC

(57) ABSTRACT

A security device and an operating method thereof, which generate masking data for masking a key on the basis of a physically unclonable function (PUF), are provided. The security device includes a PUF circuit including a plurality of PUF cells outputting random key data and masking data, a key generator configured to generate a key through post-processing performed on the random key data, and a masking module configured to mask and store the key by using the masking data, wherein the random key data and the masking data are generated by different PUF cells.

20 Claims, 18 Drawing Sheets

SECURITY DEVICE FOR GENERATING MASKING DATA BASED ON PHYSICALLY UNCLONABLE FUNCTION AND OPERATING METHOD THEREOF

CROSS-REFERENCE TO RELATED APPLICATION

This application claims priority to Korean Patent Application No. 10-2020-0011354, filed on Jan. 30, 2020, in the Korean Intellectual Property Office, the disclosure of which is incorporated herein in its entirety by reference.

BACKGROUND

The inventive concept relates to a security device for generating a key by using a physically unclonable function ("PUF") and a method of using the security device.

Recently, as wired/wireless communication technology and smart device-related technology advance rapidly, the demand for building a security system for safely using the technologies is increasing. In a fundamental method for security of communication systems and smart devices, a security device implemented as a hardware logic instead of a memory is embedded into a system/device. Such a method is a method which inspects or authenticates the presence of malicious code when a security chip is first driven and then software such as an operating system (OS) is driven. Recently, security technology having a PUF is attracting much attention, and when the PUF is used, the copying of a significant key such as an authentication key stored in a security device should be fundamentally prevented.

SUMMARY

The inventive concept provides a security device, which masks a key by using masking data in generating a key on the basis of a physically unclonable function (PUF), and an operating method of the security device. The inventive concept provides a security device, which generates masking data for masking a key by using a PUF block, and an operating method of the security device.

According to an aspect of the inventive concept, a security device includes a physically unclonable function (PUF) circuit including a plurality of PUF cells outputting random key data and masking data, a key generator configured to generate a key through post-processing performed on the random key data, and a masking module configured to mask and store the key by using the masking data. The random key data is generated from a first set of one or more PUF cells, and the masking data is generated from a different, second set of one or more PUF cells.

According to another aspect of the inventive concept, a method of generating a security key uses a physically unclonable function (PUF) circuit including a plurality of PUF cells. The method includes generating random key data by using a set of first PUF cells including at least one first PUF cell included in the PUF circuit, generating a key through post-processing performed on the random key data, generating masking data by using a set of second PUF cells including at least one second PUF cell included in the PUF circuit, masking the key by using the masking data to generate a masked key, and storing the masked key in a key buffer.

According to another aspect of the inventive concept, a security device includes a physically unclonable function (PUF) block including a plurality of PUF cells outputting random key data and masking data, a validity detector configured to determine the validity or not of the plurality of PUF cells and to generate a validity map on the basis of a result of the determination, a key generator configured to generate a key through post-processing performed on the random key data, and a masking module configured to mask and store the key by using the masking data, wherein the PUF block is configured to generate the masking data on the basis of the validity map.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Figure 1:
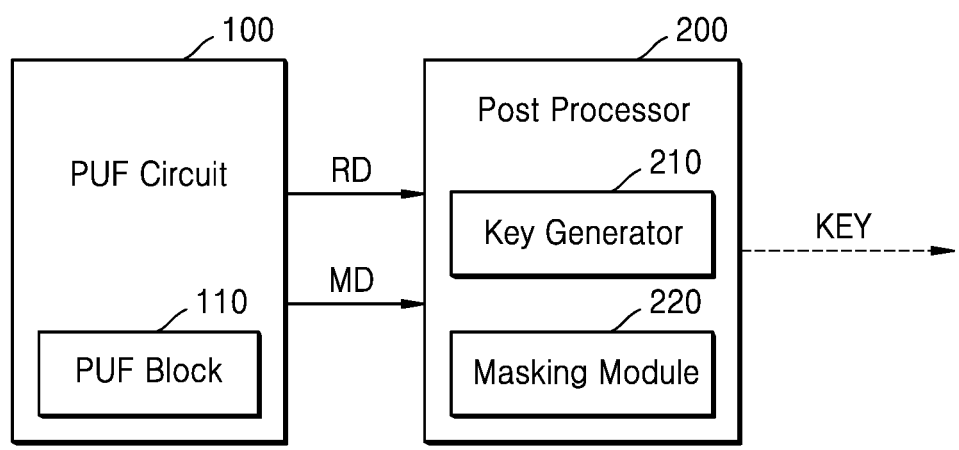
FIG. 1 is a block diagram illustrating a security device according to an embodiment.

FIG. 1 is a block diagram illustrating a security device 10 according to an embodiment.

Referring to FIG. 1, the security device 10 may generate a unique key KEY for security and may perform a security operation such as encryption/decryption by using the generated key KEY. The security device 10 may include a physically unclonable function (PUF) circuit 100 and a post processor 200.

The security device 10 may operate in one of a registration mode and a use mode. In the registration mode, the security device 10 determines valid random data among pieces of random data RD generated by the PUF circuit 100 and registers a key generated from the determined valid random data. In the use mode, based on a request of a host, the security device 10 generates a key from the random data RD generated by the PUF circuit 100 and outputs the generated key to the host. In an embodiment, the registration mode may be performed once at a time when the security device 10 is manufactured, and the use mode may be performed at a plurality of times for generating a key by using the security device 10. Random data RD used for generating a key (e.g., a non-masked key) will be alternatively referred to herein as random key data RD.

The PUF circuit 100 may include a PUF block 110. The PUF block 110 may generate the pieces of random data RD. To this end, the PUF block 110 may include a plurality of PUF source circuits. Each of the PUF source circuits may generate a signal having a unique value on the basis of the PUF. Herein, a PUF source circuit may be referred to as a PUF cell. The PUF may denote a function of providing a unique value corresponding to hardware on the basis of an intrinsic characteristic of the hardware. For example, even in a case where a plurality of pieces of hardware such as semiconductor chips are manufactured by the same process, each of the plurality of pieces of hardware may not be physically and completely matched, and slight variations may occur in the plurality of pieces of hardware. A unique value of each piece of hardware may be extracted based on the variations, and the extracted unique value may be used for applications (for example, security communication, security data processing, user identification, firmware update, etc.) requiring security. Herein, random data or masking data may denote a set of unique values or a unique value generated based on the above-described variations. The complete set of PUF cells (e.g., PUF source circuits) for use in PUF security may be designated during the design or manufacturing process, in a manner known in the art.

In some embodiments, the PUF source circuit included in the PUF block 110 may have an arbitrary structure which generates a bit signal of a unique value. The PUF source circuit is a non-limiting embodiment and may have a static random access memory (SRAM)-type PUF structure based on a value stored in an SRAM cell, have a ring oscillator structure based on a frequency variation, have a leakage-based PUF structure based on a leakage current, or have an arbiter PUF where a path of a signal is arbitrarily determined. Moreover, the PUF source circuit may generate a bit signal of a unique value on the basis of a difference between threshold levels of logic gates.

As is traditional in the field of the disclosed technology, features and embodiments are described, and illustrated in the drawings, in terms of functional blocks, units and/or modules. Those skilled in the art will appreciate that these blocks, units and/or modules, which below are described in some cases as "detectors," or "generators," are physically implemented by the specific components described herein, and/or also by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

In an embodiment, the PUF block 110 may include at least one of a PUF cell based on a transistor threshold voltage, a PUF cell (for example, a feed-forward PUF cell, an XOR PUF cell where arbiter PUF cells are disposed in parallel, a lightweight PUF cell, etc.) based on an arbiter, a PUF cell based on a ring oscillator, a memory-based PUF cell (for example, an SRAM PUF cell, a latch PUF cell, a flash memory PUF cell, a memristor PUF cell, etc.), and a reconfigurable PUF cell based on a laser beam or heat variation.

The PUF block 110 may generate the random data RD on the basis of signals generated by the plurality of PUF source circuits, and thus, the random data RD may differ from random data generated by a PUF block included in another security device having the same structure as that of the security device 10. In some embodiments, the PUF block 110 may generate n-bit random data RD (where n is an integer of 1 or more). For example, the PUF block 110 may include n number of PUF source circuits, and one PUF source circuit may generate the random data RD corresponding to 1 bit.

According to an embodiment, the PUF block 110 may generate masking data MD by using a plurality of PUF cells included in the PUF block 110 and may output the generated masking data MD to the post processor 200. The masking data MD, as described below, may be used when masking the key KEY.

The post processor 200 includes a key generator 210 and a masking module 220. The key generator 210 may receive the random data RD and generate the key KEY by performing post-processing on a plurality of pieces of random data RD. The key KEY may be an encryption key uniquely generated by the security device 10, for security. Because the integrity of a key is ensured, the key KEY may be used as a key for encryption and decryption or a key such as an authentication code.

The key generator 210 may determine whether the random data RD is valid and may generate the key KEY by using only valid random data. In an embodiment, the post processor 200 may perform an error correction operation on the key KEY.

The masking module 220 receives the masking data MD from the PUF circuit 100 and masks the key KEY by using the masking data MD. The key KEY may be stored in a buffer included in the post processor 200, for outputting the key KEY to an external device (for example, a host). However, the buffer may be exposed to an attacker through decapsulation, and due to this, an adverse effect where a key is exposed to an attacker may occur. According to an embodiment, the masking module 220 may store a masked key in the buffer, generated through masking based on the masking data MD before storing the key KEY in the buffer.

According to an embodiment, it is not possible to restore the key KEY if the masking data MD is not uncovered, and thus, the masked key may safely protect the key KEY from an attacker. Also, according to an embodiment, the masking data MD may use data randomly generated by the PUF block 110, and thus, an operation of generating the key KEY may always use the masking data MD which is randomly changed, thereby more safely protecting the key KEY from an attacker.

Although not shown, the post processor 200 may further include an error correction module for performing error correction on the key KEY. In an embodiment, the error correction module may perform error correction on the key KEY by using an error correction code. The error correction code may include at least one of low density parity check (LDPC) code, Bose, Chaudhuri, Hocquenghem (BCH) code, turbo code, reed-Solomon code, convolution code, recursive systematic code (RSC), trellis-coded modulation (TCM), block coded modulation (BCM), and coded modulation such as majority voting.

In FIG. 1, the PUF circuit 100 and the post processor 200 are illustrated as separate elements, but this is an embodiment and the PUF circuit 100 and the post processor 200 may be implemented as one element. In an embodiment, the PUF circuit 100 may be implemented as a hardware element including the PUF block 110, and the post processor 200 may be implemented as hardware or software executed by a controller, which controls the PUF block 110.

Figure 2:
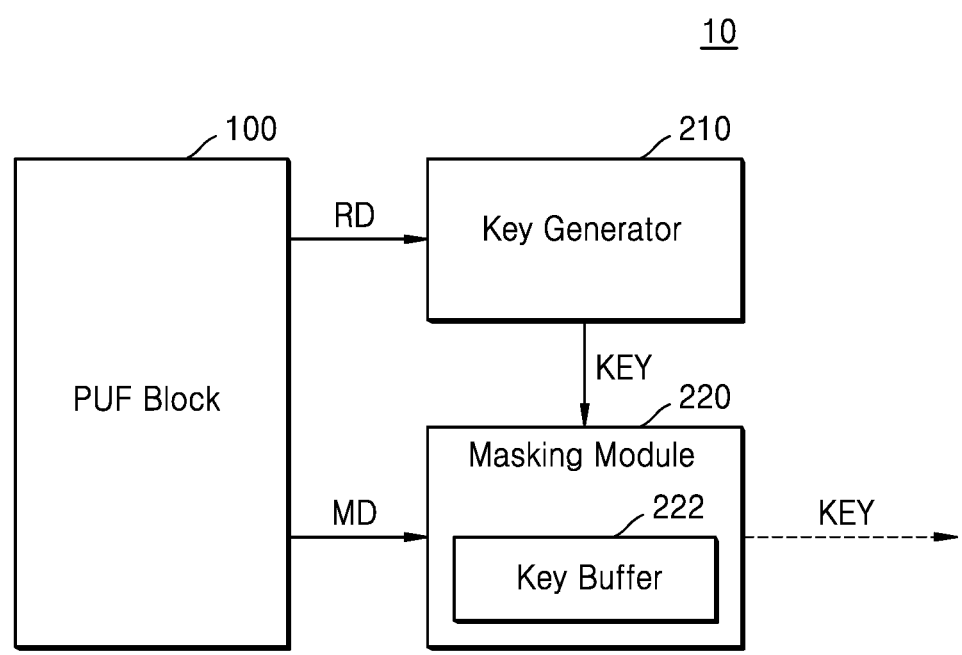
FIG. 2 is a block diagram illustrating a security device according to an embodiment.

FIG. 2 is a block diagram illustrating a security device according to an embodiment. Description, which is the same as or similar to the description of FIG. 1, is omitted.

Referring to FIG. 2, a PUF block 110 may generate random data RD by using at least some of a plurality of PUF cells and may output the generated random data RD to a key generator 210. The PUF block 110 may generate masking data MD by using at least some of the plurality of PUF cells and may output the generated masking data MD to a masking module 220.

The key generator 210 may generate a key KEY through post-processing performed on the random data RD. In an embodiment, the key generator 210 may select valid data among the random data RD and may generate a low key by using only the valid data. Also, the key generator 210 may generate the key KEY by performing error correction on the low key. The key generator 210 may output the generated key KEY to the masking module 220.

The masking module 220 may mask the key KEY by using the masking data MD to generate a masked key. In an embodiment, the masking module 220 may generate the masked key by performing a logic operation on the masking data MD and the key KEY, and in an embodiment, the masking module 220 may generate the masked key by performing an XOR operation on the masking data MD and the key KEY.

The masking module 220 includes a key buffer 222. The key buffer 222 may include a volatile memory such as a latch, a register, static random access memory (SRAM), or dynamic random access memory (DRAM).

The masking module 220 stores the masked key in the key buffer 222. The masked key may have a data array which differs from that of the key KEY, and thus, despite that an attacker checks the key buffer 222, the key KEY may not be restored from the masked key without the masking data MD. Therefore, the security of the key KEY may increase.

The masking module 220 may restore the masked key, stored in the key buffer 222, to the key KEY by using the masking data MD and may output a restored key KEY to the outside of the security device 10.

Figure 3:
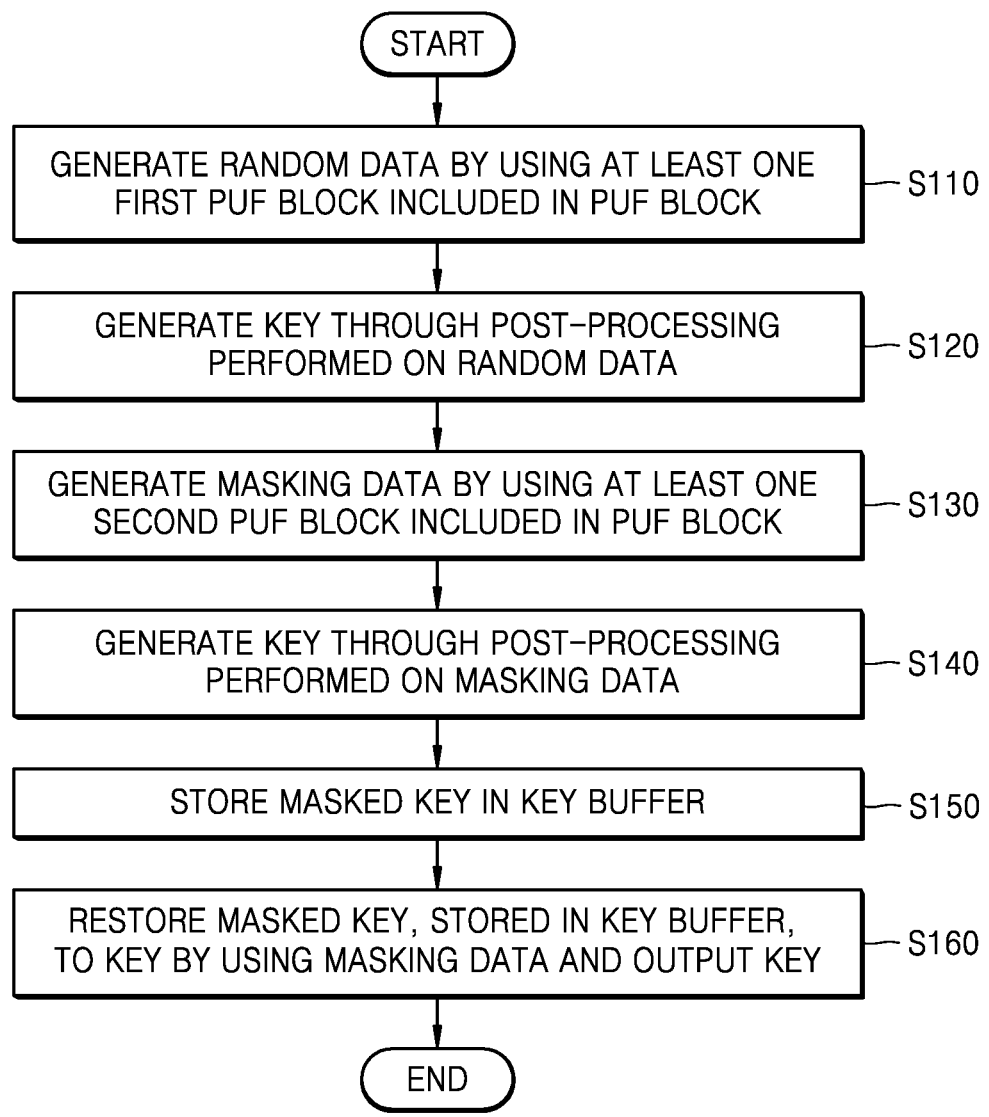
FIG. 3 is a flowchart illustrating an operating method of a security device according to an embodiment.

FIG. 3 is a flowchart illustrating an operating method of a security device according to an embodiment.

Referring to FIGS. 2 and 3, the security device 10 generates random data RD by using at least one first PUF cell included in the PUF block 110 in operation S110, and the security device 10 generates a key KEY by performing post-processing on the random data RD in operation S120. In an embodiment, the security device 10 may select valid data from among the random data RD and may perform error correction on the random data RD to generate the key KEY.

The security device 10 generates masking data MD by using at least one second PUF cell included in the PUF block 110 in operation S130. In an embodiment, the at least one second PUF cell may differ from the at least one first PUF cell. The security device 10 may mask the key KEY by using the generated masking data MD. In an embodiment, the security device 10 may generate the masked key by performing an XOR operation on the masking data MD and the key KEY.

The security device 10 may store the masked key in the key buffer 222 in operation S150. The security device 10 may restore the masked key, stored in the key buffer 222, to the key KEY by using the masking data MD and may output a restored key KEY in operation S160. In an embodiment, the security device 10 may generate the key KEY by performing an XOR operation on the masked key and the masking data MD.

Figure 4:
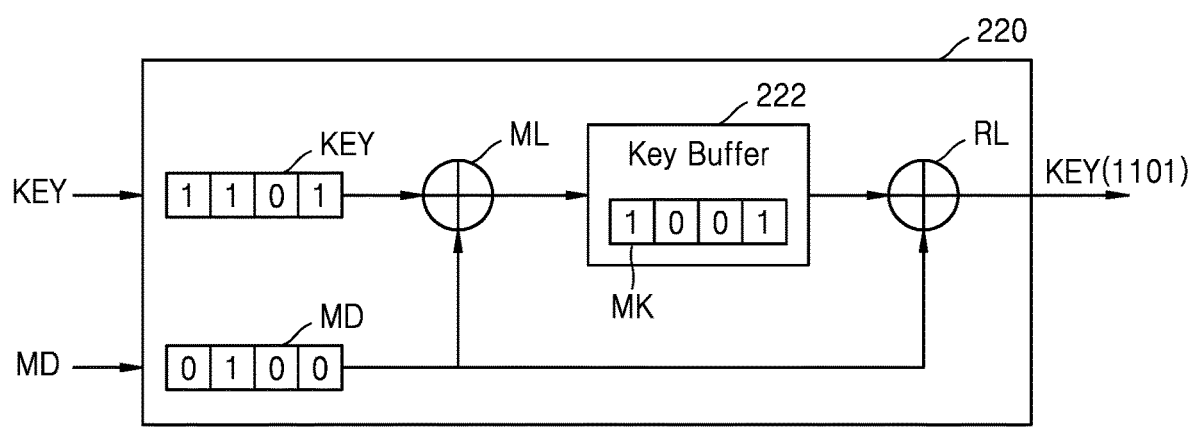
FIG. 4 is a diagram illustrating a masking module according to an embodiment.

FIG. 4 is a diagram illustrating a masking module 220 according to an embodiment. Description, which is the same as or similar to the description of FIG. 2, is omitted.

Referring to FIG. 4, the masking module 220 may include a masking device ML (e.g., masking unit or circuit), a key buffer 222, and a restoration device RL (e.g., restoration unit or circuit). The masking device ML and restoration device RL may be, for example, logic circuits. In FIG. 4, an embodiment where XOR logics are used as the masking device ML and the restoration device RL is illustrated, but the inventive concept is not limited thereto and the inventive concept may be applied to an embodiment where another device for masking and restoring a key KEY is provided.

The masking module 220 may receive "1101" as the key KEY and may receive "0100" as masking data MD. The masking device ML may perform an XOR operation on the key KEY and the masking data MD to generate a masked key MK "1001". The masking device ML may store the masked key MK in the key buffer 222.

According to an embodiment, the masking module 220 may mask the key KEY by using the masking data MD received by the masking module 220 from a PUF cell, and thus, even when an attacker attacks the key buffer 222 to obtain the masked key MK, the masking module 220 may safely protect the key KEY, thereby increasing the security of the security device 10.

The restoration device RL may receive the masked key MK from the key buffer 222 and may receive the masking data MD from the PUF block. The restoration device RL may restore the key KEY "1101" by performing an XOR operation on the masked key MK and the masking data MD and may output a restored key to the outside of the security device 10.

In FIG. 4, an embodiment where each of the key KEY and the masking data MD includes data having 4 bits is illustrated, but this is for convenience of description and each of the key KEY and the masking data MD may include data of more than 4 bits. Also, in FIG. 4, an embodiment where the key KEY and the masking data MD include the same number of bits is illustrated, but this is merely an embodiment. In other embodiments, the number of bits of the masking data MD may be greater or less than that of the key KEY.

Figure 5:
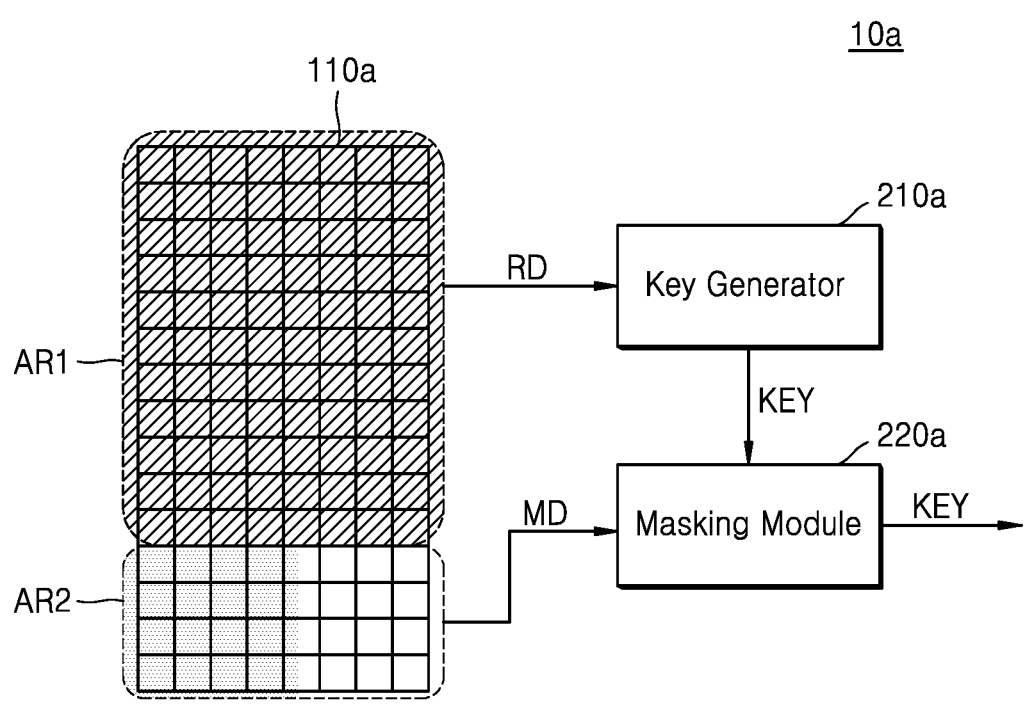
FIG. 5 is a block diagram illustrating a security device according to an embodiment.

FIG. 5 is a block diagram illustrating a security device 10a according to an embodiment. Description, which is the same as or similar to the description of FIG. 2, is omitted.

Referring to FIG. 5, the security device 10a may include a PUF block 110a, a key generator 210a, and a masking module 220a, and the PUF block 110a may include a first area AR1 including a plurality of first PUF cells and a second area AR2 including a plurality of second PUF cells. In FIG. 5, for convenience, the first area AR1 and the second area AR2 are arranged by units of rows, but this is merely an embodiment and the present embodiment may also be applied to a certain area, where the PUF block 110a is arbitrarily divided, and the other area.

The PUF block 110a may generate random data RD by using a plurality of first PUF cells included in the first area AR1. Also, the PUF block 110a may generate masking data MD by using a plurality of second PUF cells included in the second area AR2. In an embodiment, the first PUF cells included in the first area AR1 may each be a strong cell, also described as a stable cell, where output data is not changed despite several uses, and the second PUF cells included in the second area AR2 may each be a weak cell, also described as an unstable cell, where output data is changed. The first PUF cells included in the first area AR1 may each be referred to as a main cell, and the second PUF cells included in the second area AR2 may each be referred to as a redundant cell.

As described above, the key generator 210a may generate a key KEY by using the random data RD generated in the first area AR1, and the masking module 220a may mask the key KEY by using the masking data MD generated in the second area AR2 and may restore the key KEY by using the masking data MD to output a restored key.

The security device 10a according to an embodiment may divide, by units of areas, a plurality of PUF cells included in one PUF block 110a and may generate the random data RD and the masking data MD in different areas. Also, the security device 10a may generate the masking data MD by using a weak cell where output data may change over time when the same input data is input (e.g., due to temperature or voltage differences). Due to uniqueness of the key KEY, the random data RD may need to remain unchanged over time, but because the masking data MD is used at only a time for generating a masked key and temporarily storing it, a PUF cell for generating the masking data MD may generate different pieces of data on the basis of time, while still being accurately used for the masking function. Therefore, a security device 10b according to an embodiment may use a PUF cell, which is unsuitable for the use of the random data RD in generating an initial (e.g., unmasked) key, in generating the masking data MD, and thus, may perform a masking operation to form a masked key without a separate resource.

Figure 6:
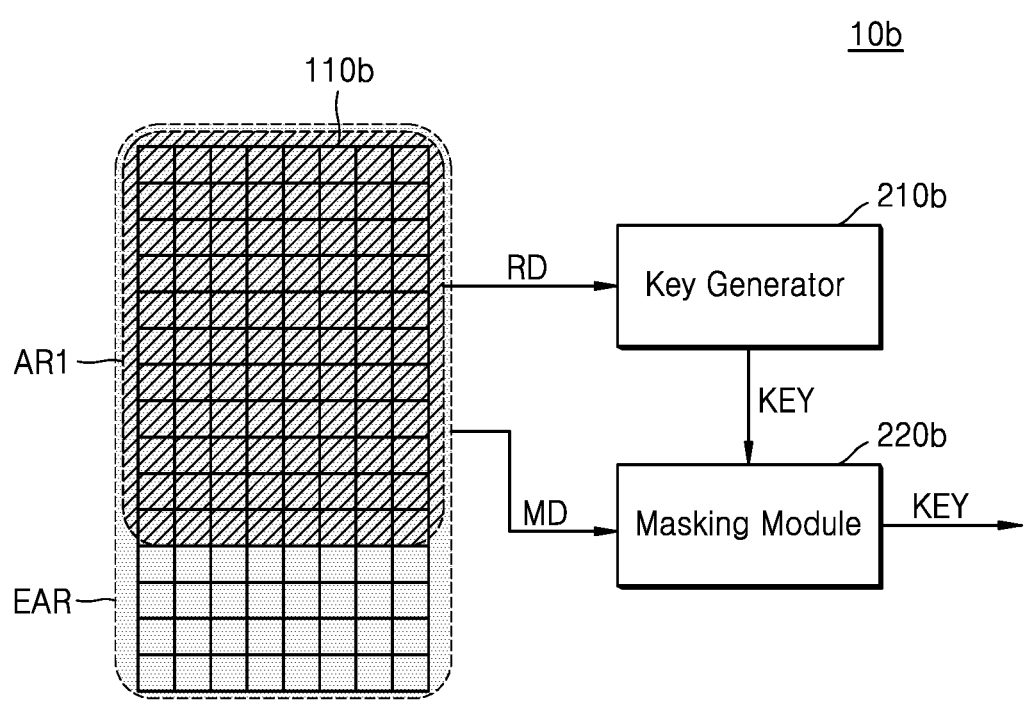
FIG. 6 is a block diagram illustrating a security device according to an embodiment.

FIG. 6 is a block diagram illustrating a security device 10b according to an embodiment. Description, which is the same as or similar to the description of FIG. 2, is omitted.

Referring to FIG. 6, the security device 10b may include a PUF block 110b, a key generator 210b, and a masking module 220b, and the PUF block 110b may include an arbitrary first area AR1. The PUF block 110b may generate random data RD by using a plurality of first PUF cells included in the first area AR1. In an embodiment, the first PUF cells may each be a strong cell where data is not changed despite several uses.

The PUF block 110b may generate masking data MD by using a plurality of PUF cells that may be included in any areas EAR of the PUF block 110b including the first area AR1.

As described above, the key generator 210b may generate a key KEY by using the random data RD generated in the first area AR1, and the masking module 220b may mask the key KEY by using the masking data MD generated from any areas EAR and may restore the key KEY by using the masking data MD to output a restored key.

As described above, a PUF cell for generating the masking data MD may generate different pieces of data on the basis of time, and thus, the security device 10b according to an embodiment may generate the masking data MD from an arbitrary PUF cell included in the PUF block 110b, regardless of whether it is a strong cell and a weak cell.

Figure 7:
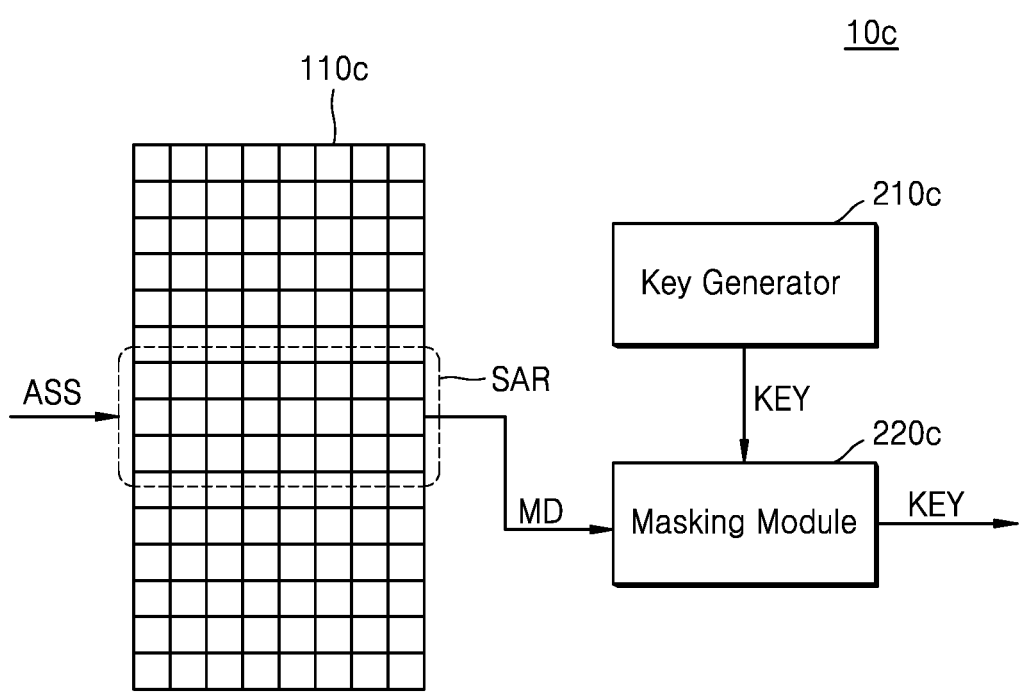
FIG. 7 is a block diagram illustrating a security device according to an embodiment.

FIG. 7 is a block diagram illustrating a security device 10c according to an embodiment. Description, which is the same as or similar to the description of FIG. 2, is omitted.

Referring to FIG. 7, the security device 10c may include a PUF block 110c, a key generator 210c, and a masking module 220c. The PUF block 110c may receive an area selection signal ASS from the outside (for example, a host). The PUF block 110c may generate masking data MD by using a plurality of PUF cells included in a selection area SAR selected based on an area selection signal ASS.

As described above, the key generator 210c may generate a key KEY by using random data RD generated in a certain area of the PUF block 110c, and the masking module 220c may mask the key KEY by using the masking data MD generated in the selection area SAR and may restore the key KEY by using the masking data MD to output a restored key.

As the PUF 110c changes the selection area SAR on the basis of an area selection signal ASS of the host, PUF cells for generating the masking data MD may be arbitrarily changed. According to an embodiment, as PUF cells for generating the masking data MD are arbitrarily changed, the randomness of the masking data MD may be reinforced.

Figure 8:
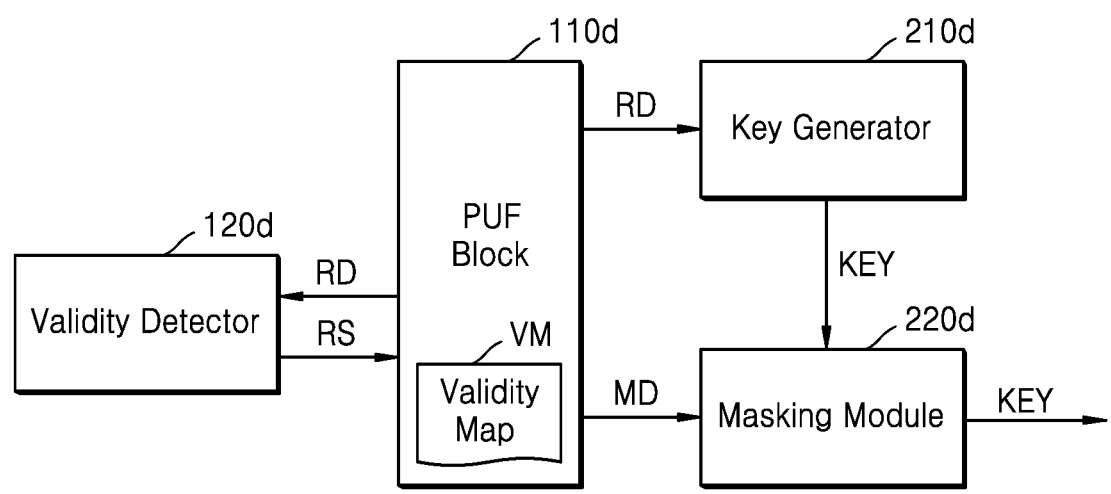
FIG. 8 is a block diagram illustrating a security device according to an embodiment.

FIG. 8 is a block diagram illustrating a security device 10d according to an embodiment. Description, which is the same as or similar to the description of FIG. 2, is omitted.

Referring to FIG. 8, the security device 10d may include a PUF block 10d, a validity detector 120d, a key generator 210d, and a masking module 220d. The validity detector 120d may receive random data RD from the PUF block 110d and may detect a validity of the random data RD to generate a validity signal VS corresponding to each of a plurality of PUF cells. Random data may be used for generating a password usable as an authentication key, and in this case, the password may have a time-invariant characteristic where a value thereof is not changed based on an ambient environment. The validity detector 120d may determine a time-invariant characteristic of digital random data and may generate a plurality of validity signals on the basis of a result of the determination. The validity detector may include hardware, firmware, and/or software configured to make this determination.

For example, in one embodiment, the validity detector 120d may generate the validity signal VS on the basis of whether pieces of random data RD, which are output from a PUF cell included in the PUF block 110d at different times, are the same. In another embodiment, the validity detector 120d may generate the validity signal VS on the basis of whether pieces of random data RD, which are output from a PUF cell included in the PUF block 110d under different external conditions (for example, a temperature, pressure, humidity, etc.), are the same.

When the validity signal VS is a first value (for example, "1") representing validity, this may denote that a corresponding PUF cell always outputs a constant value, and herein, an output of a constant value may be referred to as stable. When the validity signal VS is a second value (for example, "0") representing invalidity, this may denote that a corresponding PUF cell does not always output a constant value, and herein, an output of a non-constant value may be referred to as unstable.

The PUF block 110d may generate and store a validity map VM on the basis of the validity signal VS. The validity map VM may include information about whether a signal generated from each PUF cell is stable. The PUF block 110d may generate the random data RD and masking data MD on the basis of the validity map VM.

In an embodiment, the PUF block 110d may generate the random data RD from a stable PUF cell (i.e., a PUF cell where the validity signal VS is "1") and may generate the masking data MD from an unstable PUF cell (i.e., a PUF cell where the validity signal VS is "0"). In an embodiment, the PUF block 110d may generate the random data RD from a stable PUF cell and may generate the masking data MD from a stable or unstable PUF cell.

In an embodiment, the PUF block 110d may generate the validity map VM in a registration process, and then, the validity detector 120d may be deactivated. The PUF block 110d may store the validity map VM and may perform a key KEY generating operation by using the stored validity map VM. In FIG. 8, the validity map VM is illustrated as being stored in the PUF block 110d, but this is merely an embodiment. In other embodiments, the validity map VM may be stored in a storage device which is provided in or outside the security device 10d. According to the above, a PUF circuit, which may include hardware, software, and firmware, and which includes a PUF block, is configured to access the validity map VM generated by the validity detector 120d, to generate random key data from stable PUF cells, and to generate masking data from unstable PUF cells, based on the validity map.

Figure 9:
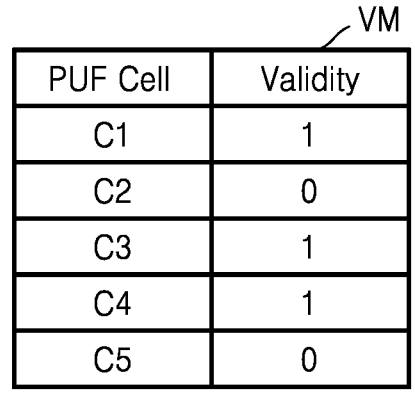
FIG. 9 is a diagram illustrating a valid map according to an embodiment.

FIG. 9 is a diagram illustrating a validity map according to an embodiment.

Referring to FIGS. 8 and 9, a validity map VM may include information about a validity of a PUF cell and an indicator identifying the PUF cell. In an embodiment, a validity bit of a first PUF cell C1 may be "1", and thus, the first PUF cell C1 may be stable. Also, a validity bit of each of a second PUF cell C2 and a fifth PUF cell C5 may be "0", and thus, the second PUF cell C2 and a fifth PUF cell C5 may be unstable. Also, a validity bit of each of a third PUF cell C3 and a fourth PUF cell C4 may be "1", and thus, the third PUF cell C3 and the fourth PUF cell C4 may be stable.

In an embodiment, the PUF block 110d may generate random data RD from a stable PUF cell and may generate masking data MD from an unstable PUF cell. For example, the PUF block 110d may generate the random data RD by using a set of one or more cells from among the first PUF cell C1, the third PUF cell C3, and the fourth PUF cell C4 and may generate the masking data MD by using a set of one or more cells from among the second PUF cell C2 and the fifth PUF cell C5.

When an attacker predicts the masking data MD, the attacker may restore masked data by using the masking data MD subsequently, thereby obtaining a key KEY. According to an embodiment, the masking data MD is generated from an unstable PUF cell, and whenever generating the key KEY, the masking data MD may vary. Therefore, the attacker may find it difficult to predict the masking data MD, and the security of the key KEY may increase.

Figure 10:
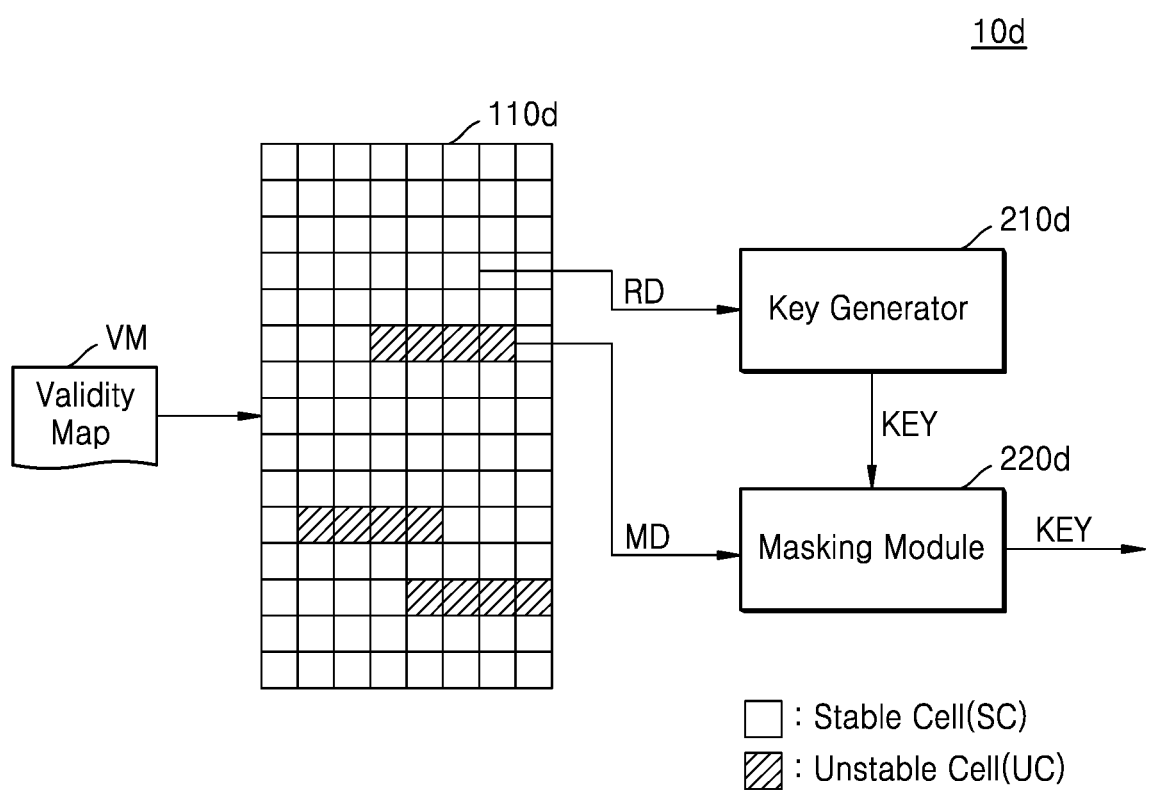
FIG. 10 is a block diagram illustrating a security device according to an embodiment.

FIG. 10 is a block diagram illustrating a security device 10d according to an embodiment. Description, which is the same as or similar to the description of FIG. 8, is omitted.

Referring to FIG. 10, the security device 10d may include a PUF block 110d, a key generator 210d, and a masking module 220d. The PUF block 110d may determine stable cells SC and unstable cells UC by using a validity map VM.

In an embodiment, the PUF block 110d generates the random data RD by using a set of one or more cells from among the stable cells SC and generates the masking data MD by using set of one or more cells from among the unstable cells UC.

In another embodiment, the PUF block 110d may generate the random data RD by using a set of one or more cells from among the stable cells SC and may generate the masking data MD by using a set of one or more cells from among a combination of the stable cells SC and the unstable cells UC.

As described above, the key generator 210d may generate a key KEY by using the random data RD generated in the stable cells SC, and the masking module 220d may mask the key KEY by using the masking data MD generated in the unstable cells SC and may restore the key KEY by using the masking data MD to output a restored key.

Figure 11:
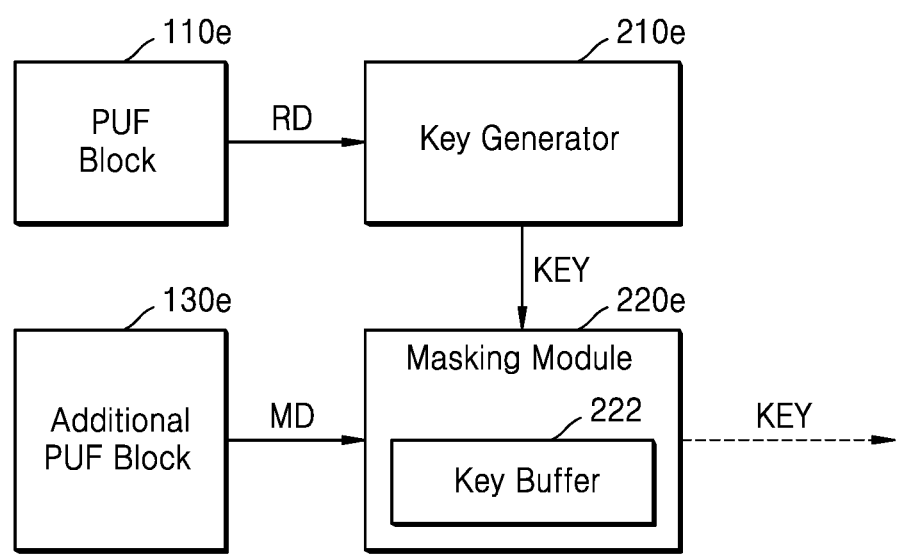
FIG. 11 is a block diagram illustrating a security device according to an embodiment.

FIG. 11 is a block diagram illustrating a security device 10e according to an embodiment. Description, which is the same as or similar to the description of FIG. 2, is omitted.

Referring to FIG. 11, the security device 10e may include a PUF block 110e, an additional PUF block 130e, a key generator 210e, and a masking module 220e. The additional PUF block 130e may include a plurality of PUF cells and may be physically separated from the PUF block 110e. The additional PUF block 130e may generate masking data MD from a plurality of PUF cells included in the additional PUF block 130e and may output the generated masking data MD to the masking module 220e. For example, the additional PUF block 130e may be a dedicated PUF block for generating the masking data MD.

As described above, the key generator 210e may generate a key KEY by using the random data RD generated in the PUF block 110e, and the masking module 220e may mask the key KEY by using the masking data MD generated in the PUF block 110e and may restore the key KEY by using the masking data MD to output a restored key.

The security device 10e according to an embodiment may include the additional PUF block 130e which exclusively uses the masking data MD independently from the PUF block 110e for generating the random data RD, and thus, the security device 10e may generate the masking data MD regardless of generating the random data RD.

Figure 12:
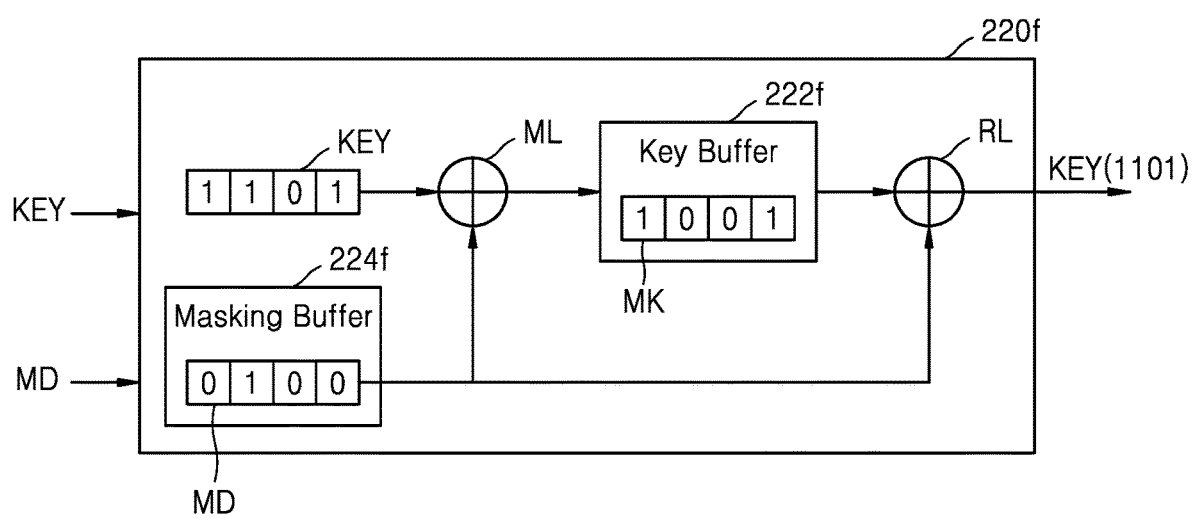
FIG. 12 is a diagram illustrating a masking module according to an embodiment.

FIG. 12 is a diagram illustrating a masking module 220f according to an embodiment. Description, which is the same as or similar to the description of FIG. 4, is omitted.

Referring to FIG. 12, the masking module 220f may include a masking device ML, a key buffer 222f, a restoration device RL, and a masking buffer 224f. The masking module 220f may receive "1101" as a key KEY and may receive "0100" as masking data MD. The masking module 220f may store the received masking data MD in the masking buffer 224f. In an embodiment, the masking buffer 224f may be protected by various security factors from an attacker.

The masking device ML may perform an XOR operation on the key KEY and the masking data MD stored in the masking buffer 224f to generate a masked key MK "1001". The masking device ML may store the masked key MK in the key buffer 222f.

The restoration device RL may receive the masked key MK from the key buffer 222f and may receive the masking data MD from the masking buffer 224f. The restoration device RL may restore the key KEY "1101" by performing an XOR operation on the masked key MK and the masking data MD and may output a restored key to the outside of the security device 10f.

According to an embodiment, the masking data MD stored in the masking buffer 224f may be used in performing masking and in performing restoration, and thus, a masking operation may be performed even without receiving the masking data MD from a PUF block twice. For example, the masking data MD can be stored in the masking buffer 224f for a longer period of time, and can be used for masking random key data RL for different keys.

Figure 13A:
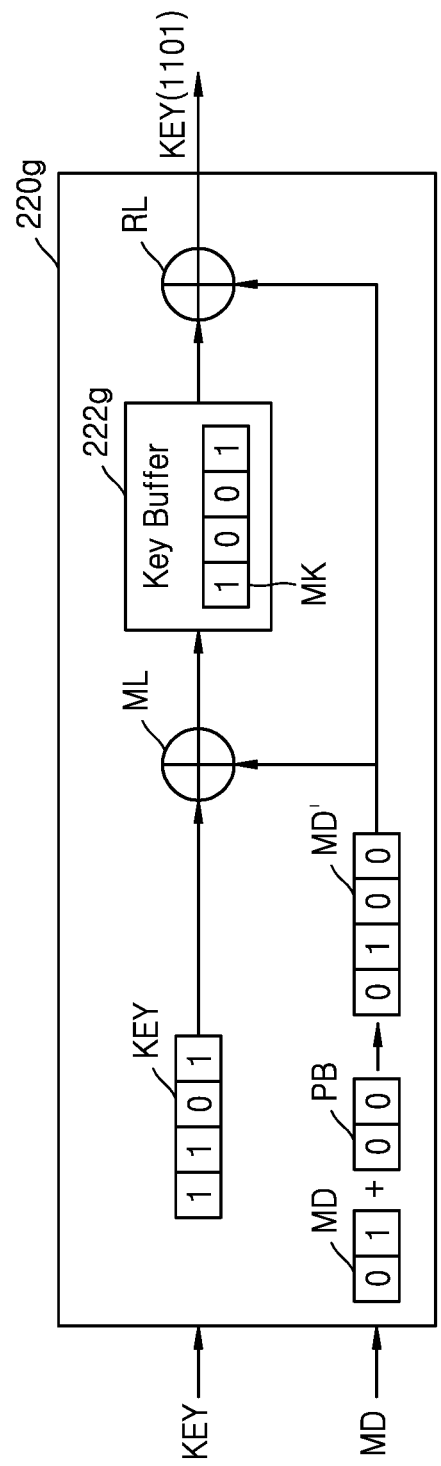
FIG. 13A is a diagram illustrating a masking module according to an embodiment.

FIG. 13A is a diagram illustrating a masking module 220g according to an embodiment. Description, which is the same as or similar to the description of FIG. 4, is omitted.

Referring to FIG. 13A, the masking module 220g may include a masking device ML, a key buffer 222g, and a restoration device RL. The masking module 220g may receive "1101" as a key KEY and may receive "01" as masking data MD. The masking module 220g may combine a preset bit PB with the masking data MD to generate new masking data MD' having a number of bits equal to the number of bits of the key KEY.

In an embodiment, the masking module 220g may predetermine the preset bit PB. In another embodiment, the masking module 220g may receive the preset bit PB from the outside (for example, a host).

The masking device ML may perform an XOR operation on the key KEY and the new masking data MD' to generate a masked key MK "1001". The masking device ML may store the masked key MK in the key buffer 222g.

The restoration device RL may receive the masked key MK from the key buffer 222g, perform an XOR operation on the masked key MK and the new masking data MD' to restore the key KEY "1101", and output a restored key to the outside of the security device 10g.

According to an embodiment, the masking module 220g may receive the masking data MD, which has a smaller number of bits than the number of bits of the key KEY, from a PUF block and may perform a masking operation by using the received masking data MD, and in this case, the masking module 220g may perform the masking operation regardless of the number of bits of the masking data MD (e.g., regardless of whether the received masking data MD has a smaller number of bits than the key KEY).

Figure 13B:
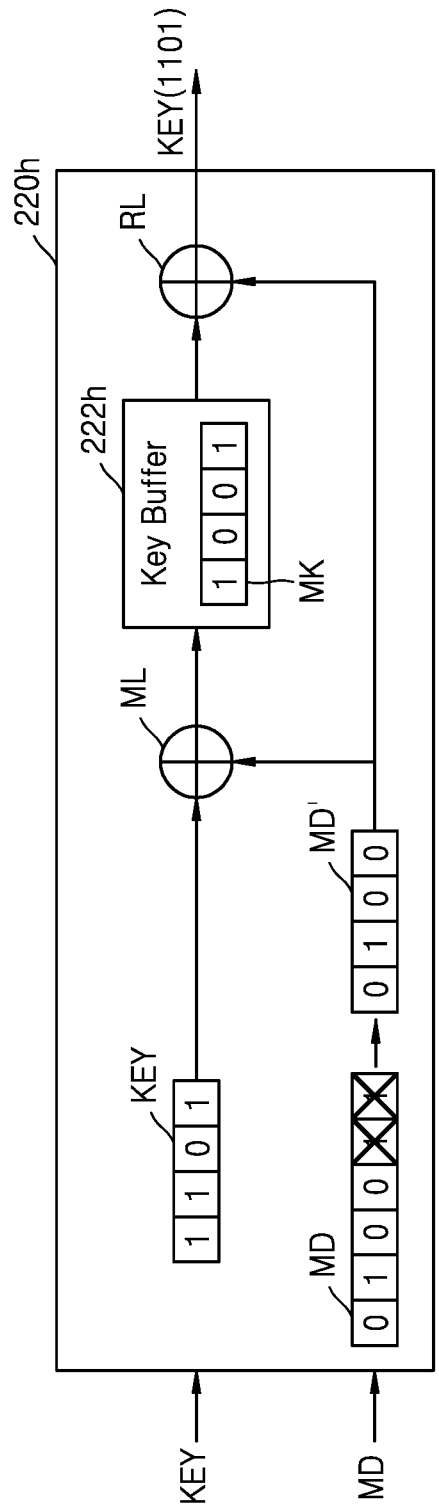
FIG. 13B is a diagram illustrating a masking module according to an embodiment.

FIG. 13B is a diagram illustrating a masking module 220h according to an embodiment. Description, which is the same as or similar to the description of FIG. 4, is omitted.

Referring to FIG. 13B, the masking module 220h may include a masking device ML, a key buffer 222f, and a restoration device RL. The masking module 220h may receive "1101" as a key KEY and may receive "010011" as masking data MD. The masking module 220h may arbitrarily delete at least one bit from the masking data MD to generate new masking data MD' having a number of bits equal to the number of bits of the key KEY.

In an embodiment, the masking module 220h may arbitrarily determine a bit which is deleted for generating the new masking data MD'. In another embodiment, the masking module 220h may predetermine a sequence of bits which are deleted for generating the new masking data MD'.

The masking device ML may perform an XOR operation on the key KEY and the new masking data MD' to generate a masked key MK "1001". The masking device ML may store the masked key MK in the key buffer 222h.

The restoration device RL may receive the masked key MK from the key buffer 222h, perform an XOR operation on the masked key MK and the new masking data MD' to restore the key KEY "1101", and output a restored key to the outside of the security device 10h.

According to an embodiment, the masking module 220h may receive the masking data MD, which has a larger number of bits than the number of bits of the key KEY, from a PUF block and may perform a masking operation by using the received masking data MD, and in this case, the masking module 220g may perform the masking operation regardless of the number of bits of the masking data MD (e.g., regardless of whether the received masking data MD has a larger number of bits than the key KEY).

Figure 14:
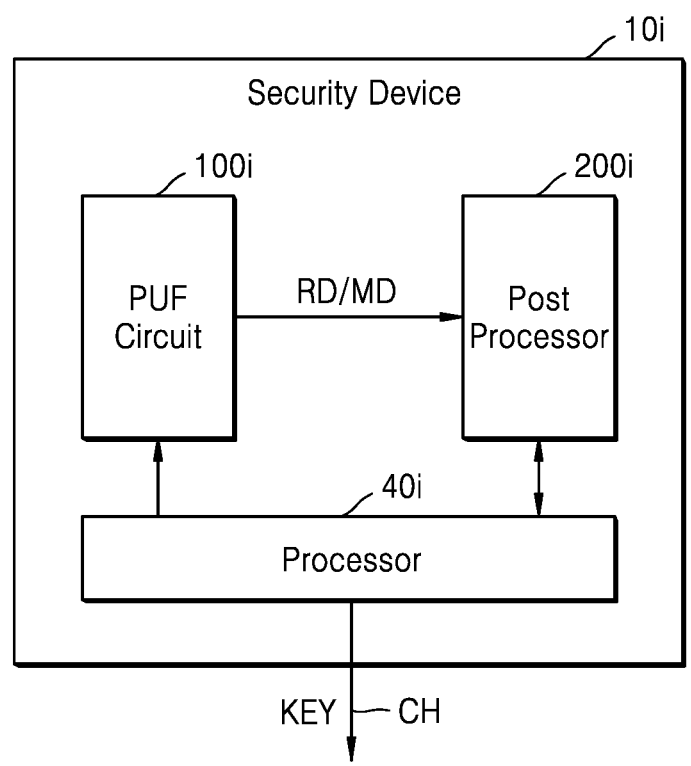
FIG. 14 is a block diagram illustrating an integrated circuit according to an embodiment.

FIG. 14 is a block diagram illustrating a security device 10i according to an embodiment. Descriptions, which are the same as or similar to the descriptions of FIGS. 1 to 13, are omitted.

Referring to FIG. 14, the security device 10i may include a function block for performing a PUF based on an attempt-authentication scheme and other functions. For example, the security device 10i may be a system-on-chip (SoC) and may further include a processor 40i as well as a PUF circuit 100i and a post processor 200i. The processor 40i may include an arbitrary processing unit for executing a series of instructions, and moreover, may include a field programmable gate array (FPGA), a hardware accelerator, etc. In an embodiment, the processor 40i may output various control signals, which are for controlling the PUF circuit 100i and the post processor 200i, to the PUF circuit 100i and the post processor 200i.

The processor 40i may communicate with another device through a communication channel CH and may transmit a key KEY. The communication channel CH may include a wired channel and/or a wireless channel.

Figure 15A:
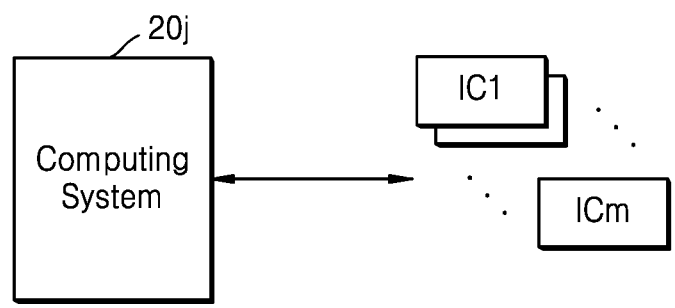
FIGS. 15A and 15B are block diagrams illustrating an environment for using a security device according to an embodiment.
Figure 15B:
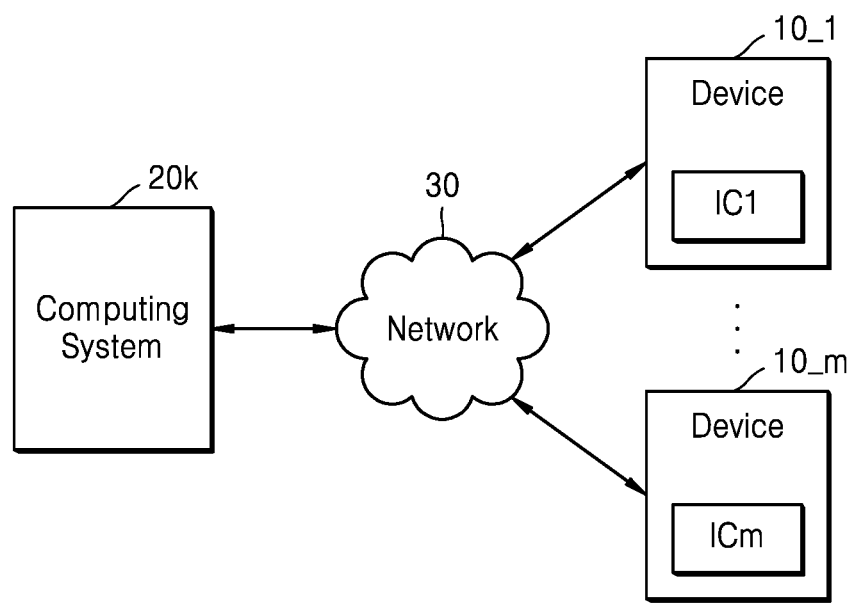

FIGS. 15A and 15B are block diagrams illustrating an environment for using a security device according to an embodiment. In detail, FIG. 15A illustrates an environment where an integrated circuit is used in a registration process, and FIG. 15B illustrates an environment where an integrated circuit is used in a use process.

Referring to FIG. 15A, a computing system 20j operated by a host (for example, a manufacturer of integrated circuits IC1 to ICm (where m is an integer of 1 or more)) may communicate with each of the integrated circuits (for example, first to $m^{th}$ integrated circuits) IC1 to ICm. For example, the computing system 20j may control the first integrated circuit IC1 to generate a validity map and may store the generated validity map in the first integrated circuit IC1. In an embodiment, each of the integrated circuits IC1 to ICm may operate in a registration mode on the basis of the method described above with reference to FIGS. 1 to 13. Each of the integrated circuits may be, for example, on a separate chip, for example, as part of a single or multi-chip semiconductor package, a memory module, or another electronic device.

Referring to FIG. 15B, a computing system 20k may communicate with a plurality of devices 10_1 to 10_m over a network 30. The computing system 20k may represent an arbitrary system for communicating with the devices 10_1 to 10_m over the network 30 on the basis of encryption. The network 30 may include an arbitrary network, and in a non-limiting environment, the network 30 may include a cellular network, local area network (LAN), wireless LAN (WLAN), etc. Also, the computing system 20k and the devices 10_1 to 10_m may communicate with each other through wired and/or wireless communication. The devices 10_1 to 10_m may be, for example, mobile phones, laptop computers, desktop computers, or other personal electronic devices that include integrated circuits.

The devices 10_1 to 10_m may provide a key to the computing system 20k over the network 30 on the basis of a validity map and helper data generated in a registration process, and the computing system 20e may perform encryption by using the key to communicate with the devices 10_1 to 10_m. In an embodiment, each of the integrated circuits IC1 to ICm included in the devices 10_1 to 10_m may operate in a use mode on the basis of the method described above with reference to FIGS. 1 to 13. The devices described above in connection with FIGS. 15a and 15b (e.g., integrated circuits IC1 to ICm, chips, semiconductor packages, memory modules, and devices 10_1 to 10_m) may be described herein as electronic devices. The security devices described in connection with the various embodiments above may be included in one or more of these electronic devices.

Figure 16:
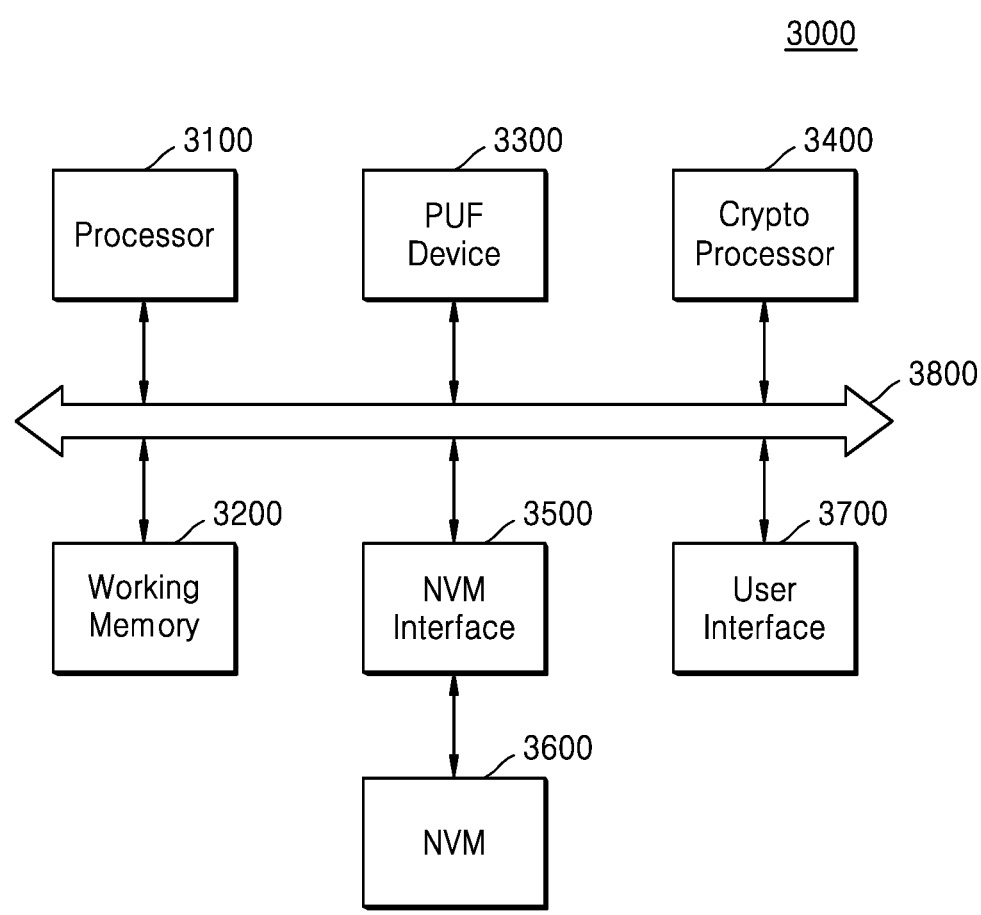
FIG. 16 is a block diagram illustrating a computing device according to an embodiment.

FIG. 16 is a block diagram illustrating a computing device 3000 according to an embodiment. In detail, FIG. 16 illustrates a computing device including one of the security devices described above with reference to FIGS. 1 to 14.

Referring to FIG. 16, a computing device 3000 includes a processor 3100, a working memory 3200, a PUF device 3300, an encryption processor ("crypto processor") 3400, a non-volatile memory (NVM) interface 3500, an NVM 3600, and a user interface 3700.

The processor 3100 controls an overall operation of the computing device 3000. The processor 3100, a central processing unit (CPU), may perform various kinds of arithmetic operations. For example, the processor 3100 may include one or more processor cores.

The working memory 3200 may exchange data with the processor 3100. The working memory 3200 may temporarily store data used for an operation of the computing device 3000. For example, the working memory 3200 may include a high-speed memory such as DRAM or SRAM.

The PUF device 3300 may be the PUF circuit 100 described above with reference to FIGS. 1 to 14. The PUF device 3300 may generate a key needed for security. The PUF device 3300 may be implemented as hardware, software, or firmware. The encryption processor 3400 may perform an encryption operation and a decryption operation by using the key output from the PUF device 3300.

The NVM interface 3500 may exchange data with the NVM 3600 on the basis of control by the processor 3100, the PUF device 3300, or the encryption processor 3400. The NVM 3600 may store data needed for maintenance regardless of the supply of power. In an embodiment, the NVM 3600 may store the validity map described above with reference to FIGS. 1 to 14.

The user interface 3700 interfaces communication between a user and the computing device 3000 on the basis of control by the processor 3100. The user interface 3700 may include an input interface such as a keyboard, a keypad, a button, a touch panel, a touch screen, a touch pad, a touch ball, a camera, a microphone, a gyroscope sensor, a vibration sensor, and/or the like. Furthermore, the user interface 3700 may include an output interface such as a liquid crystal display (LCD) apparatus, a light-emitting diode (LED) display apparatus, an organic LED (OLED) display apparatus, an active matrix OLED (AMOLED) display apparatus, a speaker, a motor, and/or the like.

A bus 3800 provides a communication path between the elements of the computing device 3000. The elements of the computing device 3000 may transmit and receive data therebetween on the basis of a bus format. In an embodiment, the bus format may include universal serial bus (USB), small computer system interface (SCSI), peripheral component interconnect express (PCIe), advanced technology attachment (ATA), parallel ATA (PATA), serial ATA (SATA), serial attached SCSI (SAS), integrated drive electronics (IDE), or the like.

While the inventive concept has been particularly shown and described with reference to embodiments thereof, it will be understood that various changes in form and details may be made therein without departing from the spirit and scope of the following claims.

What is claimed is:

1. A security device comprising:
a physically unclonable function (PUF) circuit including a plurality of PUF cells outputting random key data and masking data;
a key generator configured to generate a key through post-processing performed on the random key data; and
a masking module configured to mask and store the key by using the masking data,
wherein the random key data is generated from a first set of one or more PUF cells, and the masking data is generated from a different, second set of one or more PUF cells, wherein the first set of one or more PUF cells are cells that are more stable than cells of the second set of one or more PUF cells.

2. The security device of claim 1, wherein the PUF circuit comprises a first area including a plurality of first PUF cells and a second area including a plurality of second PUF cells and differing from the first area,
wherein the random key data is generated from the first set of one or more PUF cells, which are part of the plurality of first PUF cells, and
wherein the masking data is generated from the second set of one or more PUF cells, which are part of the plurality of second PUF cells.

3. The security device of claim 1, wherein the PUF circuit comprises a first area including a plurality of first PUF cells and a second area including a plurality of second PUF cells and differing from the first area,
wherein the random key data is generated from the first set of one or more PUF cells, which are part of the plurality of first PUF cells, and
wherein the masking data is generated from at least some of the plurality of first PUF cells and at least some of the plurality of second PUF cells, which together form the second set of one or more PUF cells.

4. The security device of claim 1, further comprising a validity detector configured to determine the validity of the plurality of PUF cells and to generate a determination result as a validity map, the validity map reflecting which of the plurality of PUF cells belong the first set of one or more PUF cells and which belong to the second set of one or more PUF cells.

5. The security device of claim 4, wherein the PUF circuit is configured to access the validity map generated by the validity detector, generate the random key data from valid PUF cells, and generate the masking data from invalid PUF cells, based on the validity map.

6. The security device of claim 4, wherein the PUF circuit is configured to access the validity map generated by the validity detector, generate the random key data from valid PUF cells, and generate the masking data from at least some of the plurality of PUF cells, based on the validity map.

7. The security device of claim 1, wherein the PUF circuit is configured to receive an area selection signal and to generate the masking data from PUF cells, included in an area selected based on the area selection signal, among the plurality of PUF cells.

8. The security device of claim 1, wherein:
the masking module comprises:
a masking circuit configured to receive the key from the key generator and generate a masked key from the key and the masking data;
a key buffer configured to store the masked key; and
a restoration circuit configured to restore the masked key to the key by using the masking data.

9. The security device of claim 8, wherein:
the masking circuit is configured to generate the masked key through an XOR operation performed on the key and the masking data, and
the restoration circuit is configured to restore the key through an XOR operation performed on the masked key and the masking data.

10. The security device of claim 1, wherein the masking module is configured to generate new masking data by combining the masking data with a preset bit and to mask the key by using the new masking data.

11. The security device of claim 1, wherein the masking module is configured to generate new masking data by deleting at least some bits of the masking data and to mask the key by using the new masking data.

12. The security device of claim 1, wherein the security device is included in an electronic device that includes one or more integrated circuits.

13. A method of generating a security key by using a physically unclonable function (PUF) circuit including a plurality of PUF cells, the method comprising:
generating random key data by using a set of first PUF cells including at least one first PUF cell included in the PUF circuit;
generating a key through post-processing performed on the random key data;
generating masking data by using a set of second PUF cells including at least one second PUF cell included in the PUF circuit;
masking the key by using the masking data to generate a masked key; and
storing the masked key in a key buffer,
wherein the set of first PUF cells include cells that are more stable than cells in the set of second PUF cells.

14. The method of claim 13, wherein the at least one first PUF cell is included in a first area of the PUF circuit, and the at least one second PUF cell is included in a second area, differing from the first area, of the PUF circuit.

15. The method of claim 13, wherein the at least one first PUF cell is included in a first area of the PUF circuit, and the at least one second PUF cell is included in a second area of the PUF circuit, and
the first area is included in the second area.

16. The method of claim 13, further comprising:
determining the validity of the plurality of PUF cells included in the PUF circuit; and
generating a determination result as a validity map.

17. The method of claim 16, wherein the at least one first PUF cell comprises cells which are determined as more stable cells, which are reflected in the validity map, and the at least one second PUF cell comprises cells which are determined as less stable cells, which are reflected in the validity map.

18. The method of claim 13, further comprising:
generating the masked key through an XOR operation performed on the key and the masking data; and
restoring the key through an XOR operation performed on the masking data and the masked key.

19. The method of claim 13, wherein the generating of the masking data comprises:
combining the masking data with a preset bit; and
outputting data, generated based on the combining, as the masking data.

20. A security device comprising:
a physically unclonable function (PUF) block including a plurality of PUF cells outputting random key data and masking data;
a validity detector configured to determine the validity of the plurality of PUF cells and to generate a validity map on the basis of a result of the determination, the validity map indicating valid cells and invalid cells;
a key generator configured to generate a key through post-processing performed on the random key data; and
a masking module configured to mask and store the key by using the masking data,
wherein the PUF block is configured to generate the masking data on the basis of the validity map.

* * * * *